United States Patent [19]

Levens

[11] 4,273,523

[45] Jun. 16, 1981

[54] SWEEP ELL PRODUCTION APPARATUS

[75] Inventor: Joseph A. Levens, Houston, Tex.

[73] Assignee: Nipak, Inc., Dallas, Tex.

[21] Appl. No.: 88,418

[22] Filed: Oct. 29, 1979

[51] Int. Cl.³ .................. B29C 17/07; B29D 23/04
[52] U.S. Cl. ............................. 425/326.1; 264/568;
264/209.4; 425/325
[58] Field of Search ............................ 425/325, 326.1;
264/568, 209, 295

[56] References Cited

U.S. PATENT DOCUMENTS

| 1,877,628 | 9/1932 | Replogle . |
| 2,389,038 | 11/1945 | German . |
| 2,964,796 | 12/1955 | Press . |
| 3,748,077 | 7/1973 | Williams et al. . |
| 3,753,635 | 8/1973 | Barnett . |
| 3,776,539 | 12/1973 | Curtis et al. . |
| 3,861,847 | 1/1975 | Barnett . |
| 3,884,612 | 5/1975 | Parmann . |

FOREIGN PATENT DOCUMENTS

| 2359746 | 6/1974 | Fed. Rep. of Germany ........... 264/295 |
| 2345643 | 3/1975 | Fed. Rep. of Germany ........... 425/325 |
| 2362465 | 6/1975 | Fed. Rep. of Germany ........... 264/295 |
| 488546 | 5/1970 | Switzerland ............................ 264/295 |

Primary Examiner—Jan H. Silbaugh
Attorney, Agent, or Firm—Richards, Harris & Medlock

[57] ABSTRACT

A sweep ell production apparatus (10) receives extruded plastic pipe (98) from an extruder (96). The plastic pipe (98) is passed through a curved sizing sleeve (100) which imparts a curvature to the plastic pipe (98) while at the same time sizing the pipe wall thicknesses and exterior diameter. After the pipe (98) passes through the sizing sleeve (100) a clamp (84) is secured about the periphery of the pipe (98). The clamp (84) is driven by means of a motor (34) which causes the clamp (84) to travel along an arc (112) which corresponds with the radius of curvature of the sizing sleeve (100). As the clamp (84) draws pipe (98) along the arc (112) of travel, the pipe (98) is set to have the desired radius of curvature. After a selected arc length of pipe (98) is produced, the pipe section is cut to produce the desired sweep ell.

7 Claims, 5 Drawing Figures

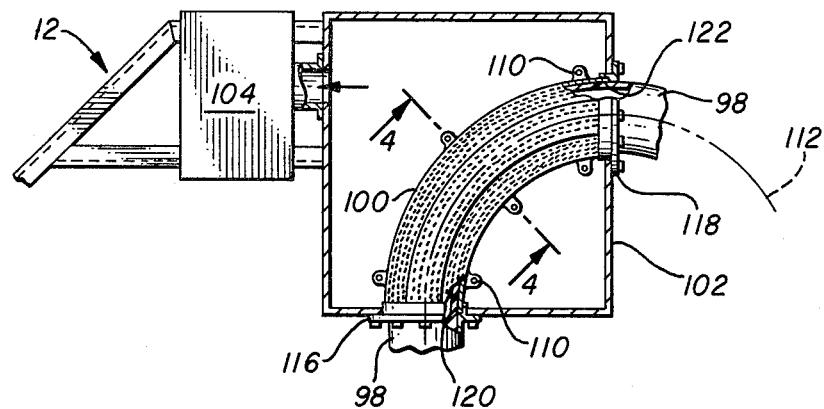
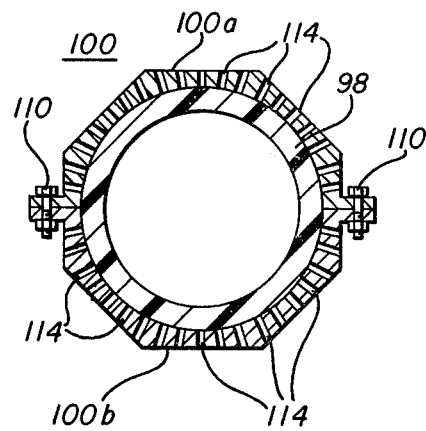
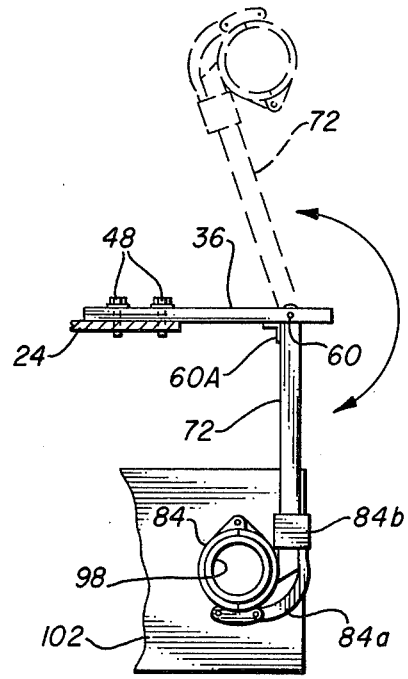

SWEEP ELL PRODUCTION APPARATUS

TECHNICAL FIELD

The present invention relates to the production of extruded plastic components and in particular to the producton of an elbow fitting comprising an extruded plastic pipe.

BACKGROUND OF THE INVENTION

In the fabrication of hollow extruded items such as pipes or tubes which are produced from thermoplastic materials, it is desirable that the final products have a uniform wall thickness. Any uneven or thin spot in the wall of a plastic pipe makes the pipe not only structurally unsound but also gives the pipe varying flexibility over its length.

A conventional method for producing a bend in a plastic pipe involves heating the pipe in a liquid bath until the plastic reaches a temperature at which it becomes pliable. The pipe is then bent into the desired shape. A major drawback in this procedure is that the exterior wall surface is stretched and becomes significantly thinner while the interior wall surface of the bend is wrinkled and made uneven. A pipe produced in this manner not ony has structural weakness on the exterior surface, a situation further aggravated by the possibility of the pipe receiving abrasion in this area, but also produces uneven fluid flow through the pipe due to the wrinkles created on the interior wall of the bend.

Further methods for producing bends in plastic pipe are shown in U.S. Pat. No. 3,748,077 to Williams et al and U.S. Pat. No. 3,776,539 to Curtis et al. In the Williams patent a pivoted arm is connected to a pipe as it is received from an extruding die and the die drives the pivoted arm through an arc. The Curtis et al invention discloses a jig which clamps to a section of pipe for bending thereof. The Curtis disclosure does not show a continuous pipe feed.

DISCLOSURE OF THE INVENTION

Production apparatus is provided for producing plastic pipe ells having a predetermined radius. Thermalplastic material is extruded to produce plastic pipe which remains pliable as it exits from the extruding die. A curved, perforated sleeve is positioned to receive the pipe from the die, the sleeve having a radius of curvature corresponding to the predetermined radius for imparting a curvature to the pipe. A pressure-tight housing is provided to enclose the sleeve with the housing having a lesser gas pressure than the interior of the pipe to provide for sizing the wall thickness and diameter of the pipe. A pulling apparatus is provided which includes a rotary shaft having a flange axially mounted thereon with a plurality of arms extending outward from the flange. A pivoted arm with a clamp is connected to each of the outboard ends of the arms. The clamp is connected about the pipe as it exits from the sleeve. The shaft is power driven to cause the clamp to pull the pipe from the sleeve and through an arc determined by the length of the arm connected to the shaft. The pulling of the pipe from the sleeve imparts the desired curvature to the pipe thereby producing an improved sweep ell fitting.

BRIEF DESCRIPTION OF THE DRAWINGS

For a more complete understanding of the present invention and the advantages thereof, reference is now made to the following description taken in conjunction with the accompanying drawings in which:

FIG. 3 is a sectional plan view of the sizing sleeve and housing shown in FIGS. 1 and 2;

FIG. 4 is a sectional view taken along line 4—4 of the sizing sleeve and extruded pipe shown in FIG. 3; and FIG. 5 is an elevation view of the pivoting arm extensions and releasable clamps of the present invention.

DETAILED DESCRIPTION OF THE INVENTION

Figure 1:
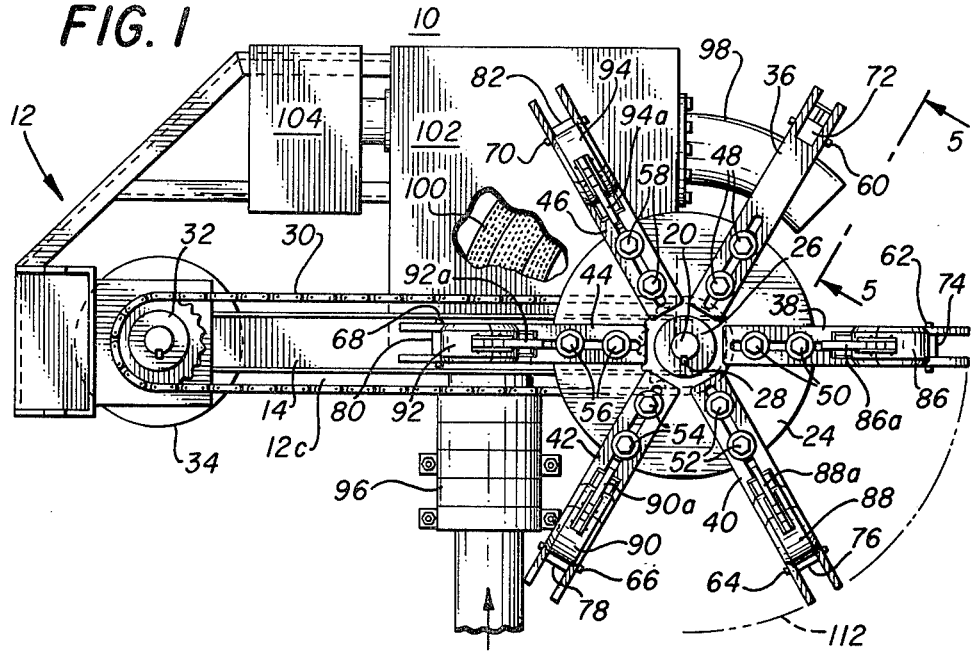
FIG. 1 is a plan view of the present invention showing an extruder, sizing sleeve, clamp, pulling arms, shaft and drive means.
Figure 2:
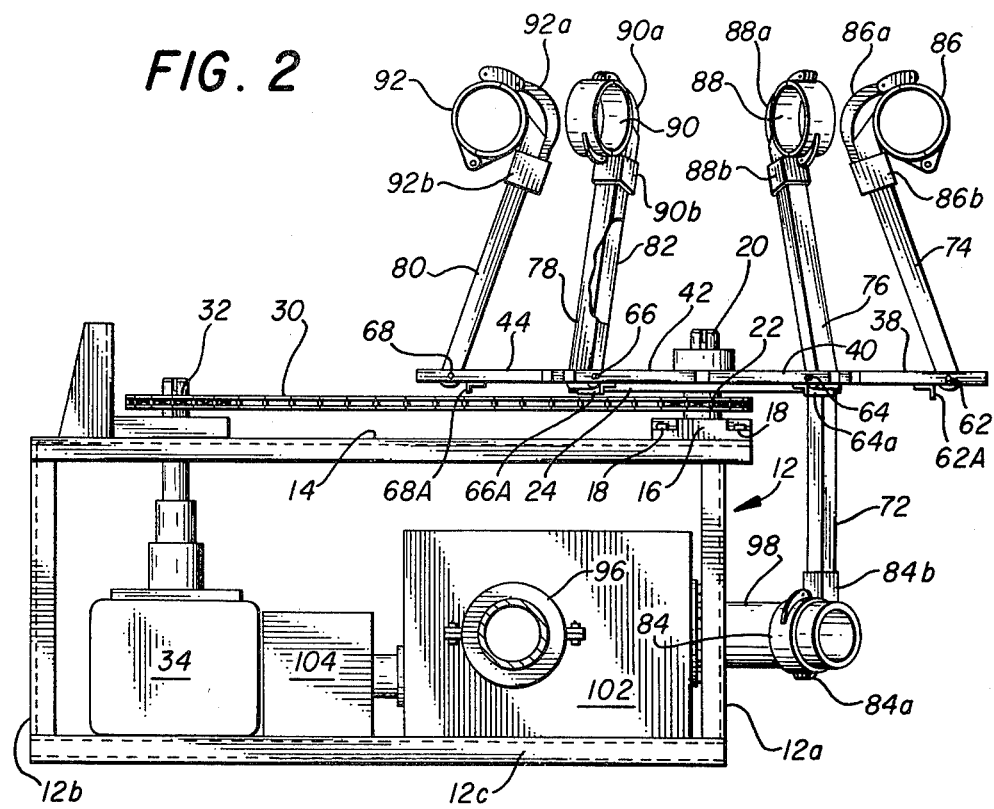
FIG. 2 is a left side elevation view of the apparatus illustrated in FIG. 1.

The apparatus comprising the present invention is shown in plan and elevation views in FIGS. 1 and 2. Plastic pipe sweep ell production apparatus 10 is supported on a rigid metal frame 12. The leg members for frame 12 are designated 12a and 12b while an upper horizontal support beam is designated 12c. An elongate plate 14 is mounted on the top of beam 12c where it serves as a support for a rectangular plate 16. Plate 16 is secured to beam 12c and plate 14 by means of bolts 18.

Plate 16 rotatably supports a shaft 20 which projects vertically from frame 12. A sprocket 22 is secured to shaft 20 immediately above plate 16. Disposed immediately above sprocket 22 and secured to shaft 20 is a flange 24 having a collar 26. The collar 26 is rotatably secured to shaft 20 by means of a key 28.

Sprocket 22 engages a chain 30 which extends laterally to engage a second sprocket 32. A motor 34 is mounted to have a vertically extending shaft which has secured thereto a sprocket 32. Therefore, motor 34 is engaged so as to rotatably drive shaft 20.

A plurality of radially extending arms 34–46 are respectively connected by bolts 48–58 to flange 24. At the outboard ends of the arms there are installed respectively pivoting connections 60–70. A plurality of extension members 72–82 are respectively mounted by means of the pivot connections 60–70 to the radial arms. At the outboard ends of extension member 72–82 there are mounted respectively ring clamps 84–94 which are adapted to be engaged and released by operation of lever arms 84a–94a. When the lever arms are closed to engage the clamps, sliding locks 84b–94b are respectively positioned over the lever arms to secure them in the locked position. Stop rests 60a–70a are provided to stop the respective pivot connection and fix the angle of the extension member relative to the radial arm.

A high-pressure pipe extruder 96 is mounted offset from and below the level of frame member beam 12c. The extruder 96 produces plastic pipe 98 and transfers the pipe to a sizing sleeve 100 which is located within a pressure housing 102. A vacuum source 104 is connected to the housing 102 and maintains a reduced air pressure therein.

Sleeve 100 and housing 102 are shown in more detail in FIGS. 3 and 4. Sleeve 100 comprises an upper semicircular section 100a and a lower semicircular section 100b. The two sections are secured together by means of bolts 110. The two sleeve sections together form a tubular member which makes a right angle through a curvature following arc 112. Sleeve 100 has a plurality of holes 114 therein which maintain a pressure at the inner surface of sleeve 100 at the same pressure as the interior of housing 102. As shown in FIG. 4, pipe 98 extends through sleeve 100 and, due to the pressure differential between the interior of the pipe and the interior of housing 102, pipe is forced outward against the interior surface of sleeve 100 to impart the desired size to the pipe.

A plate and bolt assembly 116 is provided at the junction of housing 102 with extruder 96 for mounting sleeve 100 to the interior of housing 102. A similar assembly 118 is provided at the opposite end of sleeve 100 for securing the sleeve to housing 102. Housing 102 is provided with an entrance port 120 through which the plastic pipe is transferred from the extruder 96 to the sleeve 100. An exit port 122 is provided in housing 102 for passing pipe 98 through mounting assembly 118.

FIG. 5 illustrates the various operating positions for extension member 72 which operates in a manner similar to the remaining extension members. Extension member 72 is adapted to swing about pivot connection 60 which is mounted on the outboard end of arm 36. Ring clamp 84 is secured to a section of the pipe 98 by retracting slide lock 84b toward pivot connection 60 and then operating lever arm 84a to move it outward from extension member 72. This opens clamp 84 to increase the internal diameter thereof. Pipe 98 is passed through the interior of clamp 84 and lever 84a is closed against extension member 72 to engage clamp 84 about the external periphery of pipe 98. Lock 84b is then slipped downward on member 72 and over lever 84a until the lock is wedged in place over the lever, thus holding the clamp 84 secured to pipe 98. The procedure is reversed for releasing the pipe 98. Slide lock 84b is retracted from lever 84a which is then opened to release the pipe from clamp 84. The extension member 72 is then rotated about pivot connection 60 into the upper, dotted position so that the extension member can pass on top of the various components of the production apparatus. The extension member 72 is rotated to the lower position just as it passes the output of sleeve 100. It is at this point that the clamp 84 is engaged to pipe 98.

Operation of the present invention is now described in reference to FIGS. 1–5. Extruder 96 operates in the conventional manner to feed plastic pellets to produce a uniform pliable plastic mass. The pliable mass is forced under high pressure through a die which causes the plastic to extrude in the shape of a continuous pipe. The various sections of the extruder and die are heated at appropriate temperatures so that the plastic material is maintained flexible. The temperature is controlled so that when the pipe exits from the die it has sufficient strength to maintain its shape although it is still somewhat pliable.

The plastic pipe is forced by the pressure within extruder 96 through port 120 of housing 120 of housing 102 into sleeve 100. Within sleeve 100 pipe 98 is expanded due to the reduced pressure which is maintained within housing 102. As the pipe is pressed against the internal surfaces of sleeve 100 the pipe is sized to have the desired external diameter and wall thickness. The resistance of the pipe 98 to pass through sleeve 100 creates a force differential between the interior and exterior walls of the bending pipe. This force differential causes a greater flow of plastic material from extruder 98 on the exterior wall of the bend with a lesser flow on the interior wall to thereby produce walls of uniform thickness. Sleeve 100 is constructed such that the arc line 112 passes along the central axis thereof. As the pipe 98 passes through sleeve 100 a curvature is imparted to the pipe. The pipe curvature is, however, not established merely by the travel of the pipe 98 through sleeve 100.

Immediately after pipe 98 passes through exit port 112 of housing 102, a ring clamp 84, as shown in FIG. 2, is secured about the periphery of pipe 98. The flange 24 which carries arm 36 and extension member 72 is driven by motor 34 via chain 30 such that the clamp 84 travels at approximately the same rate as the plastic pipe is being produced by extruder 96. The driving motion of motor 34 causes clamp 84 to exert a pulling force on pipe 98 to draw the pipe through sleeve 100. Further, the clamp 84, as well as the remainder of the clamps, operates along arc line 112 to draw the pipe 98 along the same radius of curvature as that of sleeve 100. As the pipe 98 progresses further along line 112 additional clamps such as clamp 94 are engaged to pipe 98 to support the pipe and maintain the pulling motion along the arc line. As the clamp 84 and extension member 72 advance, a limit of travel is reached wherein the pipe cannot proceed due to the presence of extruder 96. Despite this limit, pipe curvatures in excess of 180° can be produced before the obstruction is met. After the desired angle section of plastic pipe has been produced the section is cut and released from the clamps. The extension arm, such as 72 in the above example, is then pivoted to its upper position, as shown in FIG. 5, so that the extension member passes over the extruder 96, frame 12 and housing 102. Each of the extension members is operated likewise.

The present invention provides a positive force which tends to draw the plastic pipe 98 through and away from the sizing sleeve 100. Without the pulling action on the pipe along the arc line, pipe which is produced by merely passing it through the sleeve 100 is not of uniform curvature and thickness. The pulling action of the extension arms and clamps provides the necessary force and pressure balances which cause the pipe produced thereby to have a uniform radius of curvature while at the same time having correctly sized exterior dimensions and wall thicknesses. The apparatus of the present invention is particularly useful for producing plastic pipe having wall curves and a "tight" radius without the kinking or buckling of the pipe walls as frequently occur in the production of plastic pipes ells using prior art techniques.

In summary, the present invention provides a method and apparatus for producing sweep ells by passing a pliable extruded plastic pipe through a curved sizing sleeve while pulling the pipe out of the sleeve and along an arc line which corresponds with the radius of curvature of the sizing sleeve.

Although an embodiment of the present invention has been illustrated in the accompanying drawings and described in the foregoing Detailed Description, it will be understood that the invention is not limited to the embodiments disclosed, but is capable of numerous rearrangements, modifications and substitutions without departing from the scope of the invention.

I claim:
1. Apparatus for producing a pipe ell having a predetermined radius of curvature, comprising:
   means for producing extruded pipe;
   a curved sleeve positioned to receive said extruded pipe from said extruding means and to guide said pipe along an arc having said predetermined radius of curvature;

said sleeve being perforated along at least a portion thereof;

means connected to the perforated portion of said sleeve for applying vacuum pressure to size said pipe; and means movable along a continuation of the arc having said predetermined radius of curvature for circumferentially engaging and for pulling said extruded pipe from said sleeve to draw said extruded pipe along the arc continuation to form the pipe ell.

2. Apparatus as recited in claim 1 wherein said means for producing extruded pipe is a high-pressure die extruder adapted for extruding plastic pipe.

3. Apparatus for producing pipe ells having a predetermined radius, comprising in combination:
  (a) means for producing extruded pipe;
  (b) means for sizing the diameter and wall thickness of said extruded pipe, said means for sizing shaped to direct said extruded pipe along a curvature having said radius; and
  (c) means for pulling said extruded pipe from said means for sizing, said means for pulling provided to draw said extruded pipe along an arc having a curvature corresponding to said radius;
  said pulling means comprising a plurality of arms extending outward from a driven shaft, each arm having a releasable clamp adapted for engaging said extruded pipe after said pipe has exited from said means for sizing, said clamps drawing said extruded pipe along an arc having a curvature corresponding to said radius.

4. Apparatus as recited in claim 3 wherein said arms further include a pivot joint at a midportion thereof to permit said clamps to be selectively positioned in a plane parallel to said shaft.

5. Apparatus for producing plastic pipe ells having a predetermined radius, comprising in combination:
  (a) means for extruding plastic to produce plastic pipe,
  (b) a curved, perforated sleeve positioned to receive said pipe from said means for extruding, said sleeve having a radius of curvature corresponding to said predetermined radius for imparting a curvature to said pipe passing therethrough,
  (c) a pressure-sealed housing enclosing said sleeve, said housing having a lesser gas pressure therein than the gas pressure within said pipe, the differences in said pressures providing for sizing the wall thickness and diameter of said pipe,
  (d) pulling means comprising a rotary shaft having a flange axially mounted thereon, a plurality of arms extending outward from said flange, and an extension attached to the outboard end of each said arm by a pivot connection, said extension having a releasable clamp joined to the free end thereof, said clamp adapted for engaging said pipe about the periphery thereof, and
  (e) means for driving said rotary shaft to cause said clamps when engaged to said pipe to pull said pipe from said sleeve through an arc having a radius corresponding to said predetermined radius, said arc coplanar with the axis of said sleeve.

6. Apparatus for producing plastic pipe ells as recited in claim 5 further including means for stopping said pivot connection to fix said extension at a predetermined angle to said arm.

7. Apparatus for producing plastic pipe ells as recited in claim 5 wherein said means for driving includes a sprocket affixed to said shaft, a motor having a sprocket on the drive shaft thereof and chain means engaging said sprockets such that said motor rotatably drives said shaft.

* * * * *